United States Patent
Gruber et al.

(10) Patent No.: US 8,631,141 B2
(45) Date of Patent: Jan. 14, 2014

(54) METHOD AND DEVICE FOR LOGGING COMMUNICATIONS CONNECTIONS AT VERY HIGH DATA RATES

(75) Inventors: Ingo Gruber, Munich (DE); Michael Roth, Riemerling (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 358 days.

(21) Appl. No.: 12/673,762

(22) PCT Filed: Jun. 11, 2008

(86) PCT No.: PCT/EP2008/004691
§ 371 (c)(1),
(2), (4) Date: Feb. 16, 2010

(87) PCT Pub. No.: WO2009/021573
PCT Pub. Date: Feb. 19, 2009

(65) Prior Publication Data
US 2011/0124320 A1    May 26, 2011

(30) Foreign Application Priority Data
Aug. 14, 2007 (DE) .................. 10 2007 038 338

(51) Int. Cl.
*G06F 15/16* (2006.01)
(52) U.S. Cl.
USPC ........... 709/230; 709/213; 709/214; 709/231; 455/449
(58) Field of Classification Search
USPC ......... 709/212, 213, 214, 215, 216, 230, 231; 455/449
See application file for complete search history.

(56) References Cited

U.S. PATENT DOCUMENTS

| | | | |
|---|---|---|---|
| 6,198,936 B1 * | 3/2001 | Yang et al. | 455/515 |
| 6,259,710 B1 * | 7/2001 | Junghans | 370/522 |
| 6,675,382 B1 * | 1/2004 | Foster | 717/177 |
| 7,251,685 B1 * | 7/2007 | Yildiz | 709/221 |
| 7,272,800 B2 * | 9/2007 | Roth et al. | 715/804 |
| 7,729,349 B2 * | 6/2010 | Beckmann et al. | 370/390 |
| 2002/0009079 A1 * | 1/2002 | Jungck et al. | 370/389 |
| 2003/0033440 A1 * | 2/2003 | Hickson et al. | 709/313 |
| 2003/0037280 A1 * | 2/2003 | Berg et al. | 714/6 |
| 2003/0187824 A1 * | 10/2003 | MacInnis et al. | 707/1 |

(Continued)

FOREIGN PATENT DOCUMENTS

| | | |
|---|---|---|
| DE | 103 35 811 A1 | 3/2005 |
| EP | 1 480 379 A1 | 11/2004 |
| WO | 2006/071560 A2 | 7/2006 |

OTHER PUBLICATIONS

International Preliminary Report on Patentability, PCT/EP2008/004691, May 14, 2010, pp. 1-10.
A. Dermla, et al., "Analyse der Protokolle in lokalen Netzen bis OSL-Ebere 4", ATP/Automatisierungstechnische Praxis, vol. 30, No. 3 Jan. 1, 1988, pp. 144-146 (See International Search Report for WO 2009/021573 A1, p. 30).

(Continued)

*Primary Examiner* — Dhairya A Patel
(74) *Attorney, Agent, or Firm* — Ditthavong Mori & Steiner, P.C.

(57) ABSTRACT

The device records the data of several steps of a protocol hierarchy within a communications system. For this purpose, the data are received by a receiver and buffered by a buffer. The data consist of payload data and control information. The control information is assigned to the individual protocol-hierarchy planes. In this context, the control information of all protocol-hierarchy planes is received and buffered. Furthermore, a maximum of one copy of the payload data is buffered.

16 Claims, 6 Drawing Sheets

(56) References Cited

U.S. PATENT DOCUMENTS

| | | | |
|---|---|---|---|
| 2003/0221016 A1* | 11/2003 | Jouppi et al. | 709/245 |
| 2004/0039979 A1* | 2/2004 | Garani | 714/752 |
| 2004/0196859 A1* | 10/2004 | Benner | 370/413 |
| 2006/0015655 A1* | 1/2006 | Zur et al. | 710/5 |
| 2006/0262732 A1* | 11/2006 | Joutsenvirta et al. | 370/254 |
| 2006/0282748 A1* | 12/2006 | Bader et al. | 714/776 |
| 2007/0165851 A1* | 7/2007 | Roberts | 380/201 |
| 2008/0225816 A1* | 9/2008 | Osterling et al. | 370/342 |
| 2008/0310461 A1* | 12/2008 | Bader et al. | 370/537 |

OTHER PUBLICATIONS

International Search Report, WO 2006/071560 A3, pp. 1-3, Jun. 2, 2006.

International Search Report, WO 2009/021573 A1, pp. 30-35, Sep. 9, 2008.

R. Caceres et al., "Measurement and Analysis of IP Network Usage and Behavior", IEEE Communications Magazine, vol. 38, No. 5, May 2000, pp. 144-151.

* cited by examiner

METHOD AND DEVICE FOR LOGGING COMMUNICATIONS CONNECTIONS AT VERY HIGH DATA RATES

CROSS-REFERENCE TO RELATED APPLICATION

The present application is a national phase application of PCT Application No. PCT/EP2008/004691, filed on Jun. 11, 2008, and claims priority to German Patent Application No. DE 10 2007 038 338.1, filed on Aug. 14, 2007, the entire contents of which are herein incorporated by reference.

BACKGROUND OF THE INVENTION

1. Field of the Invention

The invention relates to a method and a device for logging data of several protocol-hierarchy planes within communications links with very high data rates, in particular, in communications links according to the Long Term Evolution standard or other mobile-radio and/or mobile-telephone systems.

2. Discussion of the Background

Conventionally, the entire data of all protocol-hierarchy planes are recorded in order to log data of several protocol-hierarchy planes within communications links with very high data rates. With transmission methods with a very high data rate, the recording of a multiple of this data rate is feasible only at great cost as a result of the several protocol-hierarchy planes.

DE 103 35 811 A1, for example, discloses a message analysis device and an associated method, which allow the transmitted data between several protocol-hierarchy planes of a communications system to be logged. However, redundancy within the data of the different levels is not exploited here. Accordingly, even redundant data are re-buffered for every plane.

SUMMARY OF THE INVENTION

Embodiments of the invention advantageously provide a method and a device for logging data of several protocol-hierarchy planes within communications links with very high data rates, which operate or respectively operates reliably even with very high data rates of the communications link, and causes a low-cost.

In order to record data of several steps of a protocol hierarchy in a communications system, the data are received by a receiver and buffered by a buffer. The data consist of payload data and control information. The control information is assigned to the individual protocol-hierarchy planes. In this context, the control information of all protocol-hierarchy planes is received and buffered. Moreover, a maximum of one copy of the payload data is buffered. Accordingly, by contrast with the re-buffering of the payload data with the control information for every protocol-hierarchy plane, this achieves a significant reduction in the quantity of information to be buffered.

The payload data are advantageously re-grouped by the protocol-hierarchy planes. References to the payload data are preferably buffered by the buffer with the control information of the protocol-hierarchy planes. As a result of the buffering of references to the payload data, the buffered data can be utilized without restriction. Re-groupings of the payload data between the protocol-hierarchy planes are also compensated as a result.

The control information of the individual protocol-hierarchy planes is buffered in each case precisely once. This further reduces the buffer requirements.

Precisely one copy of the payload data is advantageously buffered by the buffer. Accordingly, all information of the communication can be reconstructed.

Alternatively, no copy of the payload data is buffered by the buffer. In this manner, the memory requirement can be further reduced, if the payload data are known, a successful transmission can be assumed with a plurality of applications, and the transmitted payload data are not therefore required.

The payload data and the control information are preferably buffered by the buffer in separate files. Access to given, sought data is facilitated as a result of the separate buffering.

By preference, the payload data and the control information are transmitted from the receiver to the buffer and buffered by the buffer with different methods. The control information is advantageously transmitted from the receiver to the buffer with a redundant, error tolerant method and buffered by the buffer. The payload data are preferably transmitted with a non-redundant, non-error-tolerant method from the receiver to the buffer and buffered by the buffer. Accordingly, in given applications, the relatively more important control data can be accessed with high security, while the payload data, which typically provide a high-volume, but are less essential for the specific application, are buffered at low-cost.

BRIEF DESCRIPTION OF THE DRAWINGS

The invention is described by way of example with reference to the drawings, in which one advantageous exemplary embodiment of the invention is presented. The drawings are as follows.

DETAILED DESCRIPTION OF EXEMPLARY EMBODIMENTS OF THE INVENTION

Initially, the general structure and functioning of the logging system for a communications system will be described with reference to FIGS. 1 and 2. The type and volume of data to be buffered is presented with reference to FIGS. 3 and 4. On the basis of FIGS. 5-7, the functioning of the method according to the invention and the device according to the invention will then be explained with reference to exemplary embodiments. In some cases, a repetition of the presentation and description of identical elements in similar drawings has been omitted.

Figure 1:
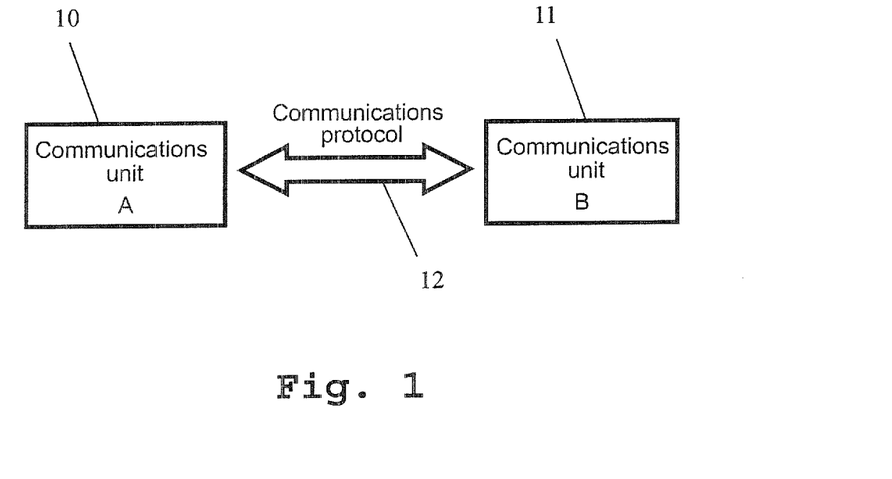
FIG. 1 shows an exemplary structure of a communications relationship between two user devices.

FIG. 1 shows an exemplary structure of a communications relationship between two user devices 10, 11. The user devices 10, 11 are connected by means of the communications protocol 12. Modern communications protocols are capable of supporting a plurality of extremely different applications. In general, communications protocols are used in order to exchange data (for example, control information) of an arbitrary type between two units 10, 11. These units 10, 11 can each be part of a larger unit. For example, this is the case in a computer, in which the processor and the main memory transmit data alternately to one another through a communications protocol. However, they can be completely independent units which communicate with one another using communications protocols. One of the best-known communications protocols of this category is, for example, the Internet Protocol (IP), with which computers can exchange information with one another over great distances. A further subdivision into sub-groups can be made, if a distinction is made between wire-bound or wireless transmission paths. A large number of communications protocols are protocols, which can exchange data in a wireless manner between two user devices. Some known examples of protocols are Wireless LAN (WLAN), WiMAX, or Universal Mobile Telecommunications System (UMTS).

The high complexity of communications protocols necessitates an extensive testing of the implementations in order to detect promptly any errors, before the implementations are used in production. For this purpose, reference data are ideally exchanged between the two communicating partners, and their correct reception is tested at both reception ends. To reconstruct potential errors in the logging process in a simple manner, it is helpful, if all data exchanged between the communications units are secured for subsequent analysis. This shadowing of the communication for test purposes is referred to as logging.

Figure 2:
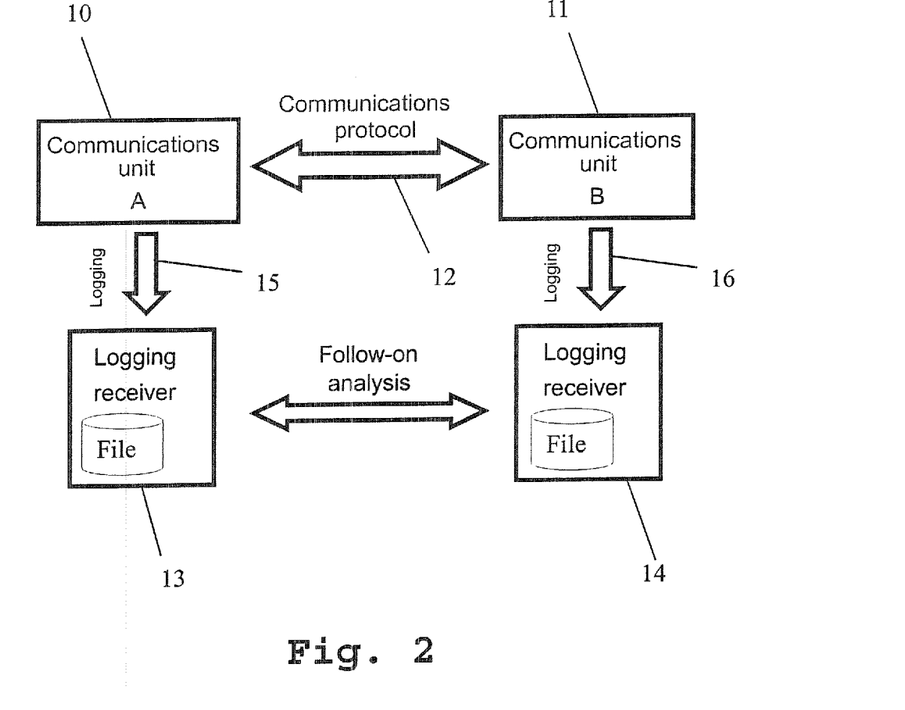
FIG. 2 shows an exemplary structure for logging and analysis of a communications link.

FIG. 2 presents an exemplary structure for the logging and analysis of a communications link between two user devices 10, 11. These are connected through the communications protocol 12. The logging receivers 13, 14 are presented alongside the two participating communications units 10, 11. These additional units buffer the incoming logging data 15, 16 continuously for subsequent analysis of the results. As a result of the accurate logging of all data exchanged between the communications units 10, 11, the logging data 15, 16 contain an accurate model of this communication. By logging all information exchanged on both sides of the communications protocol 12, a complete reconstruction of the communication can be achieved. Accordingly, a subsequent and simple analysis of the entire communication is possible. When all of the information exchanged has been logged, any erroneous portion of the information exchange can easily be detected and subsequently repaired. Such functionality is generally important for any required tests of communications protocols. However, in particular, it is indispensable for testing extensive implementations, such as mobile-radio standards.

However, more extensive transmission standards basically no longer use a single communications protocol but mostly a plurality of mutually matched and supporting protocols. These then generally cover more than one layer in the ISO/OSI reference model. One known example is the mobile-radio standard UMTS. In the case of UMTS, the layers 1-3 are standardized. For this reason, the mobile-radio standard UMTS also contains several units logically separated from one another, which do, however, support one another in part.

Figure 3:
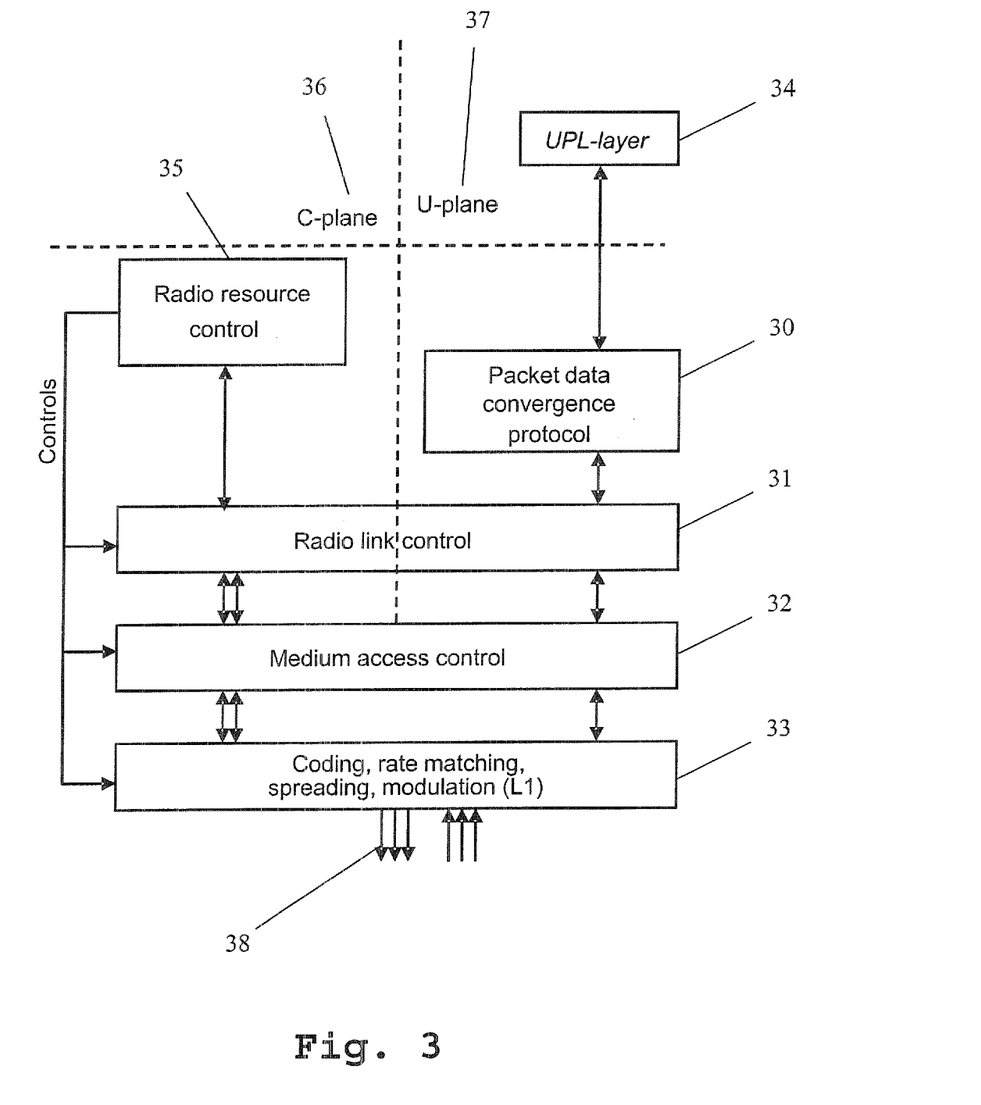
FIG. 3 shows the structure of a protocol hierarchy based on the example of UMTS.

FIG. 3 shows the structure of a protocol hierarchy on the example of UMTS. This comprises all the protocols standardized for UMTS and the totality of all protocol processing units used for UMTS. The protocol hierarchy, also referred to as the protocol stack in the case of UMTS, is subdivided into a control plane (C-plane) 36 and a user-plane (U-plane) 37. In this case, the C-plane 36 controls the communications relationship, while U-plane 37 receives, processes and re-routes the actual data to be exchanged. U-plane data are received in the UPL layer 34 from the higher layers, C-plane data are initially generated in the Radio Resource Control 35. The U-plane data are processed one after the other by the protocol-hierarchy planes: Packet Data Convergence Protocol 30, Radio Link Control 31, Medium Access Control 32 and Coding, Rate Matching, Spreading and Modulation 33. Block 33 outputs the data in the form of a radio transmission 38. In this context, the blocks 31, 32 and 33 are controlled by the Radio Resource Control 35.

Figure 4:
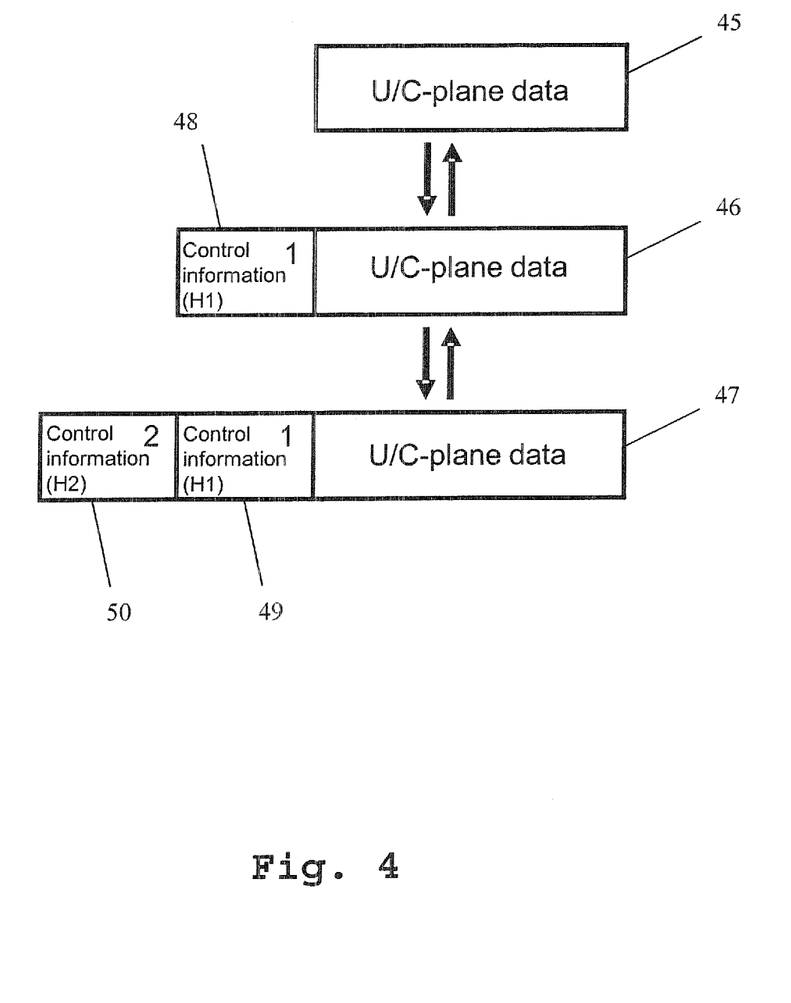
FIG. 4 shows a schematic presentation of the structure of the data on various protocol-hierarchy planes.

FIG. 4 presents a schematic illustration of the structure of the data on various protocol-hierarchy planes. Packets of the C-plane and also of the U-plane are re-routed through the lower layers for transmission to the reception unit disposed opposite. For processing on the opposite side of the communications link, every protocol-hierarchy plane adds additional information in the form of control information 48, 49, 50 to the packet 45, 46, 47 originally to be processed. This control information 48, 49, 50 allows the opposite position to identify and further process the packet 45, 46, 47 in an appropriate manner. In the opposite direction, in every protocol-hierarchy plane, the data received from the lower levels are processed and, after the removal of the no-longer-required control information 48, 49, 50, re-routed for further processing to the layer disposed above. C-plane data packets are finally processed in the radio resource control 35 and then deleted, while U-plane data packets in the UPL layer 34 are delivered to the higher layers.

Accordingly, for a complete re-constructability of a communications link, it is necessary for all data to be logged. This means that all of the processed communications information must be logged in every protocol-hierarchy plane. Because the individual protocol units support one another to some extent, they also process the same original data several times.

Accordingly, a volume of logging data larger by multiples than the total information exchanged between communications partners, is caused. This requires a rapid communications link to the logging data receiver, and the latter must be capable of processing the incoming, large data volumes and securing them permanently. This places a high demand on the performance of the logging-data receiver.

Figure 5:
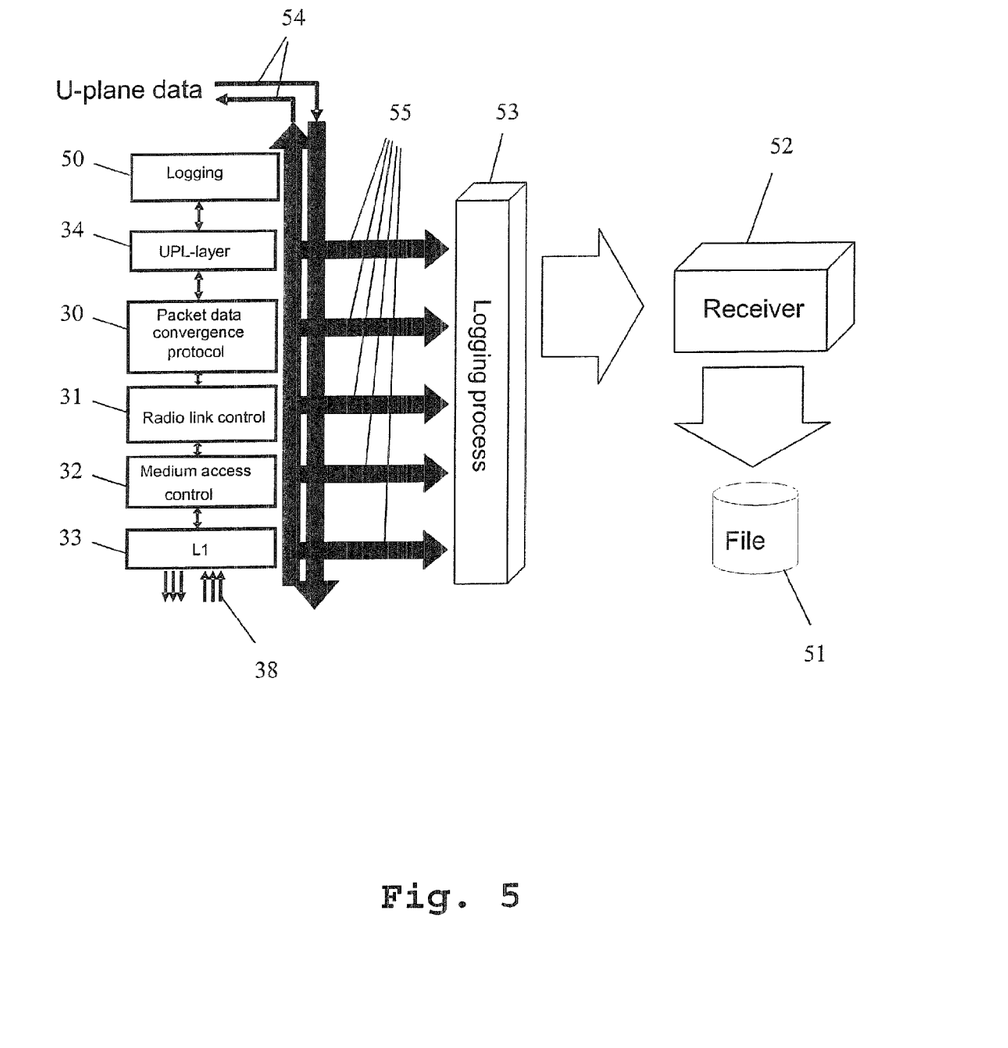
FIG. 5 shows a first exemplary structure of a system for recording logging data within a UMTS communications system.

FIG. 5 shows a first exemplary structure of a system for recording logging data within a UMTS communications system. The U-plane data 54 are transmitted to the protocol hierarchy. The logging data 55 of all protocol-hierarchy planes 30, 31, 32, 33 and 34 are transmitted to a receiver 52 and buffered in a logging file 51. In block 50, no separate logging of the data is implemented. A presentation of the logging of C-plane data is explicitly excluded, because their data rate is negligible (<2%) relative to the U-plane data rate. It is evident that the U-plane data must be processed in five layers of the protocol hierarchy and must also be logged. In this context, a logging data rate at least 500% greater than the original U-plane data rate occurs. The actual logging data rate will effectively be somewhat larger than four times the U-plane data rate, because the additionally added control information in the individual layers must also be logged. Furthermore, all logged messages must be provided with a timestamp, in order to allow time classification of the individual messages. As a result, the logging cost is additionally increased.

The maximum transmission rate in the case of UMTS is 2 MBit/s in the downlink and 384 kBit/s in the uplink. In this context, downlink refers to the direction from the base station to a mobile user device; uplink refers to the opposite direction. A complete logging of a communications relationship this kind can be achieved without difficulty using currently available technology. The UMTS further developments of high-speed packet access (HSPA) can currently transmit 14 MBit/s in the downlink and 5 MBit/s in the uplink. Even with these data rates, a complete logging is still possible at reasonable cost with currently available technology, however, the demands on the logging equipment and the receiver are significant.

The disadvantage of the logging technology used hitherto is therefore quite evidently that it scales only very poorly with increasing U-plane data rates. However, as a result of the low processed data rates, the need for an optimisation of the logging process has not hitherto existed. This has changed, however, with the further development of the UMTS mobile-radio standard. HSPA should be able to transmit up to 50 MBits/s in the downlink; while long-term evolution (LTE) should be able to transmit up to 100 MBit/s in the downlink and 50 MBit/s in the uplink. As a result of the envisaged, very high data rates, especially in the case of LTE, very large data volumes are continuously provided for logging. If the estimate of a logging data rate four-times higher continues to be assumed, data volumes of 50 Mbytes of logging data for every recorded second of protocol are obtained. The processing and also the permanent buffering on a hard disk for a complete logging is therefore technically possible only at extremely high cost or not at all.

With an effective logging according to the invention of the mobile-radio communications link, it continues to be possible to log all relevant data with significantly reduced costs for processing the logging data. The advantage of the invention is that no data need to be rejected, but rather the processing of redundant logging information is avoided. This means that the approach of the invention operates without loss of logging information, and all details of a communication continue to be preserved and can be reconstructed in a subsequent analysis. Additionally, the memory space required for this on a non-volatile medium is considerably reduced through a redundancy-free buffering of the logging data. As a result of this optimisation, a complete logging of a high-data-rate mobile radio link now again becomes possible.

The analysis of the logging data has shown, that a large part of the logged data originates through the processing of U-plane data, because the different protocol-hierarchy planes support one another. The control information additionally appended to the U-plane data and the C-plane data represent only a very small percentage of the logging data rate occurring. Accordingly, if the U-plane data are only buffered once, and reference is then made to this logging respectively at a different place, the cost for the processing is considerably reduced. No additional calculations (for example, in the compression of the data) are required for this purpose, but only a referencing of the already buffered data. The remaining control information can be logged with very low processing and storage costs because of their small number and size by comparison with U-plane data packets. With the previous logging of the mobile radio link, at least five times as many logging data occur as original information exchanged between two communicating partners. By contrast, in the case of a redundancy-free buffering of the logging information, only slightly more logging data occur than data originally exchanged.

The wireless connecting path between a mobile radio station and a user device has a theoretical transmission bandwidth specified by the transmission channel. This cannot be changed without changing physical properties. Technical measures allow the optimum exploitation of the available theoretical bandwidth. In this context, one optimisation value is to maximize the volume of payload data (U-plane data), which can be exchanged between a mobile radio station and a user device per unit of time. For a maximum efficiency of the wireless transmission, the proportion of control information in the overall data transmission must therefore be as small as possible. Control information, here, is both information, which sets up, maintains and breaks down again the communications link between the mobile radio station and the user device (C-plane data) and also control information, which is appended to the payload data for the further processing in the receiver.

Accordingly, in the context of the standardisation of a mobile-radio standard in general, in order to reduce the proportion of control information, consideration is given to minimising the volume of C-plane data, and also the size of the control information, which is appended to the payload data. This means that U-plane data generally represent by far the largest proportion of a data communication. Moreover, the individual protocol-hierarchy planes of the UMTS mobile-radio standard depend heavily upon one another. Data packets from upper levels are rearranged in levels disposed below and/or receive new control information but are not otherwise changed.

Both properties can be exploited within the framework of this invention in order massively to reduce the volume of logging data. Because the protocol-hierarchy planes strongly support one another, the original payload data (U-plane data) are extracted, logged and otherwise buffered only in the uppermost level (in this case the logging plane 50). This can be implemented in the transmission direction in the case of a reception of the data from the upper levels or from another PC, and in the reception direction shortly before the re-routing to the upper layers or another PC. Accordingly, the cost for logging-processing of the payload data is minimal.

Figure 6:
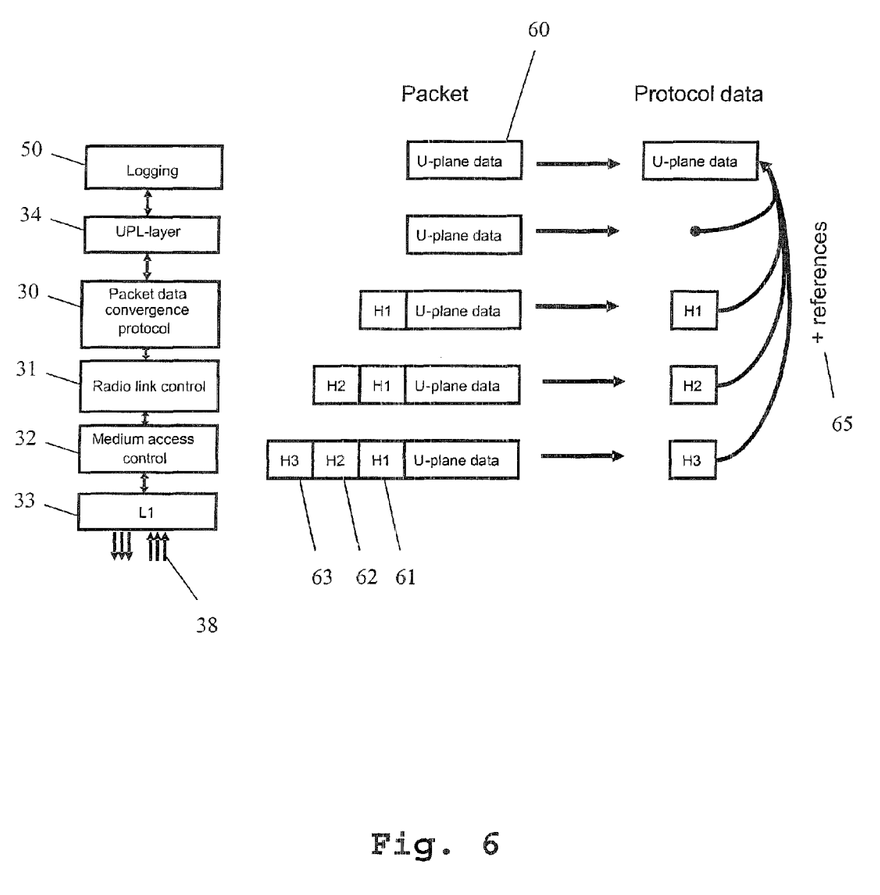
FIG. 6 shows a schematic overview of the buffered data in an exemplary device according to the invention.

In levels disposed below this, the complete logging of the entire received data or data to be transmitted is not required. As described, only the control information within the payload data packets represent new information. Accordingly, it is sufficient if only this newly arising information is logged in the individual planes. A new logging of already logged payload data can be omitted. A referencing of the already logged data is sufficient for a complete reconstruction of the original data packets. As a result, the data volume, which is necessary for a logging of the entire communications relationship, can be significantly reduced. This link between the planes of the protocol hierarchy, the packet data and the logging data is illustrated in FIG. 6. Only the control information 61, 62 and 63 and references 65 to the payload data 60 are buffered in addition to the payload data 60.

Because every mobile-radio standard (and therefore especially also LTE) strives to minimize the control information in the overall data volume, the proportion of these in the logging is also very small. The approach of the invention only to log the non-redundant information therefore allows a significant reduction of the logging data rate generated. In this context, by referencing the payload data packets, the average size of the logging packet is reduced without causing a reduction in the overall number of packets to be logged. Accordingly, it is again possible to use standard technology, in order to process and permanently buffer a completely re-constructable communication between the base station and the user device.

The pure payload data, as received or re-routed from the layers disposed above, and the control information can be separated very easily. As a result, the logging information can also be buffered in two different files. On the basis of the different relevance of payload data and control information, these can also be transmitted to the receiver with different methods. Because the control information has a greater relevance for the analysis of the communications relationship, this can be transmitted to the receiver using an error-secured protocol, and can therefore be logged reliably and completely. Because of the relatively lower relevance of the payload data for an error analysis of the communications protocol, a non-error-secured protocol can be used to log these data. Accordingly, individual items of information in these logging data can be lost, but the cost of the logging can also be further reduced.

As shown above, the logged payload data generate a larger data volume in logging than the control information. Because of these significantly different data volumes, the payload data can also be deleted again earlier, and only the logging file with the control information buffered in the long-term, thereby further reducing the memory requirement. As already suggested, in a subsequent analysis, the complete logging data can be reconstructed from the logged payload data and control information. For this purpose, the payload data referenced in the logging data are presented together with the control information. Accordingly the presentation appears as if all data in all protocol-hierarchy planes have been logged.

For a subsequent analysis of the communications relationship between the transmitter and receiver, a chronological sorting of the individual logging data must be possible. With the invention described above, this sorting is also not restricted, because the overall number of logged packets is not reduced by the invention, but only their individual size. Accordingly, an individual timestamp can be assigned to each packet processed in the protocol hierarchy, so that subsequent chronological sorting is possible.

Dependent upon the mobile-radio standard and the properties of the mobile-radio channel, payload data packets in the lower planes of the protocol hierarchy (for example radio link control 31 or medium access control 32) can be segmented or concatenated (concatenated). In the case of a segmentation, one individual payload data packet is distributed over several, smaller packets. In the case of a concatenation, the opposite occurs, namely, several payload data packets are combined to form one larger packet. This process must also be registered in the logging. Here also, an efficient logging of the processes can be implemented through the use of references as described, because in each case, the entire data packets do not need to be buffered.

Figure 7:
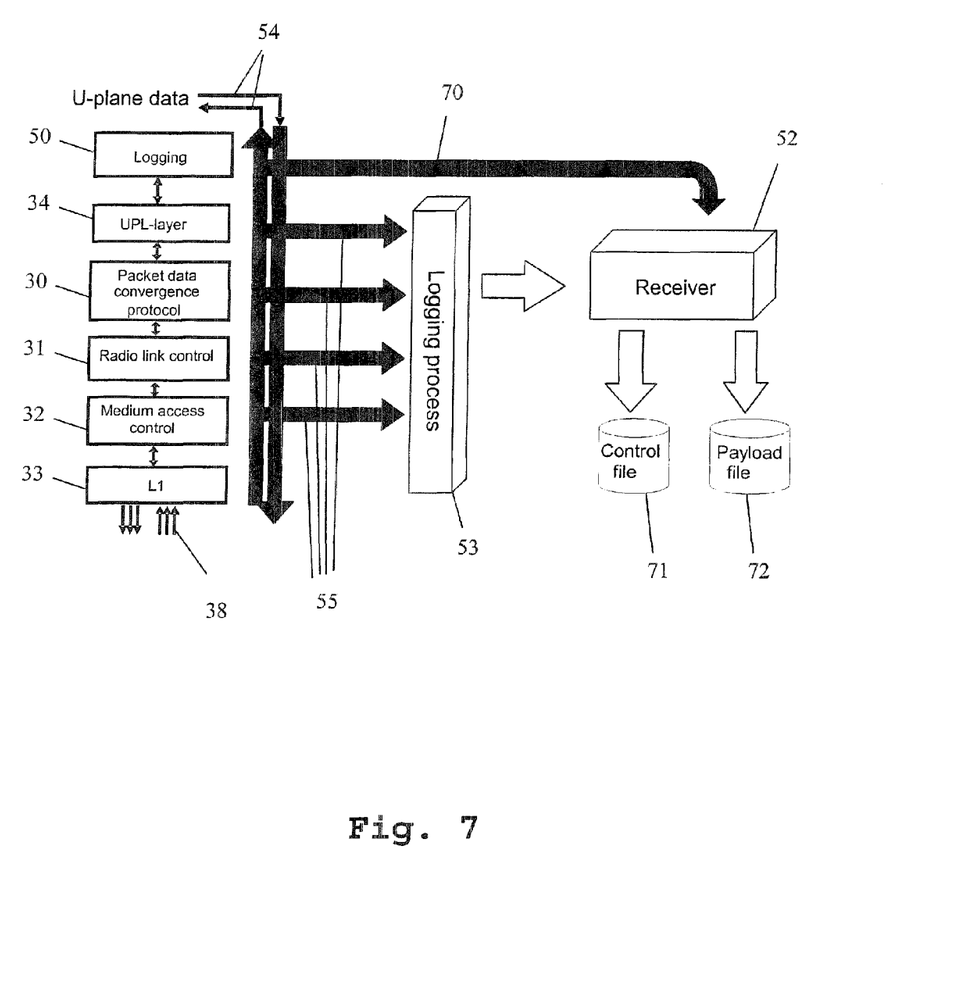
FIG. 7 shows a second exemplary structure of the system for recording logging data within a UMTS communications system.

FIG. 7 shows the entire process for optimized processing of the arising logging data. In this context, the possibility of buffering the different logging data in different files is emphasized. The payload data are recorded before the addition of control information in the special protocol-hierarchy plane: logging 50, which is disposed upstream of the UPL layer 34, and routed to the receiver 52. The logging data of the further protocol-hierarchy planes are processed by the logging process 53. In this context, the references for the payload data are generated and time stamps are inserted. The data are transmitted to the receiver 52. This offers the payload data in the payload file 72 and the control information in the control file 71.

The invention is not restricted to the exemplary embodiment presented. As already mentioned, the links of various communications standards can be logged. A use for protocols with a different number of protocol hierarchy steps is also conceivable. All of the features described above or illustrated in the drawings can be combined with one another as required within the framework of the invention.

The invention claimed is:
1. A method comprising:
logging data of several steps of a protocol hierarchy within a communications system for mobile radio and/or mobile telephones,
wherein the data includes payload data and control information,
wherein the control information are assigned to the individual protocol-hierarchy planes, each individual protocol-hierarchy plane being of a different hierarchal plane,
wherein the control information of all protocol-hierarchy planes is buffered,
wherein a maximum of one copy of the payload data is buffered,
wherein the control information is logged in the individual protocol-hierarchy planes,
wherein only newly arising information is buffered in the individual protocol-hierarchy planes,
wherein the payload data and the control information are buffered in separate files,
wherein references pointing to the buffered payload data and references pointing to the buffered control information of other protocol-hierarchy planes are buffered with the control information of the individual protocol-hierarchy planes, and
wherein the payload data are buffered only in an uppermost plane of the protocol-hierarchy planes.
2. The method according to claim 1,
wherein the control information of the individual protocol-hierarchy planes is buffered in each case precisely once.
3. The method according to claim 2,
wherein the control information is transmitted with an error-tolerant method to a buffer and buffered.
4. The method according to claim 2,
wherein the payload data are transmitted with a non-error tolerant method to a buffer and buffered.
5. The method according to claim 1,
wherein the control information is transmitted with an error-tolerant method to a buffer and buffered.
6. The method according to claim 1,
wherein the payload data are transmitted with a non-error tolerant method to a buffer and buffered.
7. The method according to claim 1,
wherein precisely one copy of the payload data is buffered.
8. The method according to claim 1,
wherein no copy of the payload data is buffered.
9. A device for recording data of several steps of a protocol hierarchy within a communications system for mobile radio and/or mobile telephones, said device comprising:
a receiver and buffer,
wherein the data includes payload data and control information,
wherein the control information is assigned to the individual protocol-hierarchy planes, each individual protocol-hierarchy plane being of a different hierarchal plane,
wherein the receiver receives the control information of all protocol-hierarchy planes, and the buffer buffers this,
wherein the receiver buffers a maximum of one copy of the payload data in the buffer,
wherein the control information is logged in the individual protocol-hierarchy planes,
wherein only newly arising information is buffered in the individual hierarchy planes,
wherein the buffer buffers the payload data and the control information in separate files,
wherein references pointing to the buffered payload data and references pointing to the buffered control informa- tion of other protocol-hierarchy planes are buffered in the buffer with the control information of the individual protocol-hierarchy planes, and wherein the payload data are buffered only in an uppermost plane of the protocol-hierarchy planes.

10. The device according to claim 9, wherein the buffer buffers the control information of the individual protocol-hierarchy planes in each case precisely once.

11. The device according to claim 10, wherein the receiver transmits the control information to the buffer with a redundant, error tolerant method.

12. The device according to claim 10, wherein the receiver transmits the payload data to the buffer with a non-redundant, non-error-tolerant method.

13. The device according to claim 9, wherein the receiver transmits the control information to the buffer with a redundant, error tolerant method.

14. The device according to claim 9, wherein the receiver transmits the payload data to the buffer with a non-redundant, non-error-tolerant method.

15. The device according to claim 9, wherein precisely one copy of the payload data is buffered in the buffer.

16. The device according to claim 9, wherein no copy of the payload data is buffered by the buffer.

* * * * *